United States Patent [19]

Garrett et al.

[11] 3,711,661

[45] Jan. 16, 1973

[54] DISTRIBUTING TERMINAL ASSEMBLY TEST APPARATUS

[76] Inventors: Jim C. Garrett; Robert H. Johnson; Jack Shelton, all of 3300 East Spring St., Long Beach, Calif. 90806

[22] Filed: Feb. 5, 1971

[21] Appl. No.: 112,925

[52] U.S. Cl. ........................................179/175.1 R

[51] Int. Cl. ............................................H04m 3/22

[58] Field of Search .......179/175.1, 175.2 R, 175.25, 179/175.11, 175, 1 PC; 340/378; 324/76 R, 73 R; 200/61.41, 61.42

[56] References Cited

UNITED STATES PATENTS

| | | | |
|---|---|---|---|
| 3,333,138 | 7/1967 | Eagle | 324/73 |
| 3,444,465 | 5/1969 | Teixeira | 200/61.41 |
| 3,141,107 | 7/1964 | Wasserman | 324/76 R |
| 2,956,229 | 10/1960 | Henel | 179/175 |
| 3,253,220 | 5/1966 | Hordosi | 324/73 R |
| 1,615,219 | 1/1927 | Franfield | 179/175.1 R |

OTHER PUBLICATIONS

IBM Technical Disclosure Bulletin, Von Feldt Vol. 7, No. 2, July 1964, p. 122.

*Primary Examiner*—Ralph D. Blakeslee
*Assistant Examiner*—Douglas W. Olms
*Attorney*—Hyman Jackman

[57] ABSTRACT

Test unit apparatus for use relating to distribution terminal assemblies employed in connection with telephone trunks under test. Testing is performed through the use of voltage-sensing probes which monitor the potential present on trunks characterized by either three or four leads. Comprehensive testing of the wiring of the equipment associated with the trunk being tested reveals all commonly encountered trunk wiring defects, visual indications of malfunctioning circuits being provided by means of plural lamps each having a distinctive function.

8 Claims, 6 Drawing Figures

INVENTORS
JIM C. GARRETT
ROBERT H. JOHNSON
BY JACK SHELTON
Hyman Hackman
ATTORNEY INVENTORS
JIM C. GARRETT
ROBERT H. JOHNSON
JACK SHELTON
[signature]
ATTORNEY INVENTORS
JIM C. GARRETT
ROBERT H. JOHNSON
BY JACK SHELTON
Hyman Jalkman
ATTORNEY

INVENTORS
JIM C. GARRETT
ROBERT H. JOHNSON
BY JACK SHELTON

Hyman Jackman
ATTORNEY

INVENTORS
JIM C. GARRET
ROBERT H. JOHNSON
JACK SHELTON
BY Hyman Jackman
ATTORNEYS

DISTRIBUTING TERMINAL ASSEMBLY TEST APPARATUS

BACKGROUND OF THE INVENTION

1. Field of the invention

This invention relates generally to a tester applicable to distributing terminal assemblies of the type for terminating the wires of the selector banks in telephone central offices. More particularly, this invention relates to a hand-held test set which, when pressed against the distributing terminal assemblies found in telephone central exchanges, calls for only a momentary contact with the terminals being tested to achieve the test results, and which introduces no interference to the equipment on which the test is made.

2. Description of the prior art

The constantly changing traffic requirements as communities grow and change necessitates frequent additions, rearrangements, and regrouping of trunking equipment within the telephone exchanges. To facilitate such additions and rearrangements of trunking, the distributing terminal assembly multiplies the sets of banks of the selector switches so that the back of a distributing terminal assembly terminates the wires of the selector banks and crossconnects the selector bank terminals and the outgoing cables. By arranging the distributing terminal assembly in a number of horizontal rows each having a certain number of pins, convenient access points are provided at which the potential present on the either three or four leads of a trunk may be monitored. Conventional methods of verifying distributing terminal assembly wiring are unable to automatically perform the detecting function without complex connecting procedures and they generally prescribe a test sequence which requires extended contact with the terminals to be tested. Other presently available devices such as hand-held meters and voltage measuring device require a complicated technical analysis of the indications presented in a fashion which directly relates their usefulness to the proficiency of the operator. Such prior art test devices indicate in most cases only the presence of defects but not the specific nature of the defect encountered, so that they are unable to meet the operational characteristics which are in such great demand in the areas of telephone systems installation and servicing. Illustrative and somewhat analogous prior art devices over which the test device embodying the invention clearly distinguishes are described in the following U.S. Pat. Nos.: 2,846,526; 3,061,691; 3,253,220; 3,333,188; 3,350,515 and 3,412,392.

SUMMARY OF THE INVENTION

In its preferred form, the invention comprises voltage-sensing switching networks which monitor the potential present on a particular group of terminals in the distributing terminal assembly. Voltage conditions are detected and are coupled to voltage-sensitive networks through the use of probes brought into momentary contact with the terminals to be tested. The push buttons associated with the probes are metallic and thus contribute to forming an electrical path when pressed against the terminals with sufficient pressure. Within the portable case which encloses the component parts the electrical path is continued to a plurality of electrical contact points which extend to appropriate integrated circuit boards which include test plugs whereby automatic testing of the entire device during manufacture is facilitated. Electrical information concerning the potentials present on the terminals under test is conveyed to the voltage-sensitive networks by forcibly applying the probes against the terminals using as a verification of good electrical contact the mechanical force applied. Voltage-sensing transistor circuits and associated solid-state components act as switching elements for electronically presenting via easily decipherable lamp indications the nature of the defect or defects encountered in the process of reading the potentials taken from the trunk under test.

The actual process of defect detection comprises a sequence of operations performed by the device which reads the potential on the terminals being tested and then impresses an electrical condition on the terminals to simulate a telephone user's demand for service. Simultaneous with this action the device continues to monitor the potentials present and will respond to erratic behavior on the part of the equipment, which take place as a result of the simulation.

Accordingly, an object of the invention is to provide a testing device capable of detecting and displaying those defects generally found to be associated with the wiring of telephone distributing terminal assemblies.

Another object of the invention is the provision of a testing device which performs its detection function automatically, the only act required being that of establishing a momentary contact between the probes and the terminals to be tested.

A further object of the invention is test apparatus for telephonic use which, although extremely compact, conveniently indicates all defects encountered without the need of detailed technical evaluation.

Another object of the invention is to provide test apparatus which in the course of deriving outputs as a function of electrical potentials simultaneously verifies a conductive connection with all the terminals under test, by virtue of the electrically conductive probes, the physical pressure required for their operation, and the spring loaded feature which ensures their automatic return once removed from the terminals being analyzed.

Still another object of the invention is the provision of a telephone trunk testing unit which checks trunks in fractions of a second, requires no recalibration once factory calibrated, is of pocket size, and efficiently utilizes solid state components throughout.

BRIEF DESCRIPTION OF THE DRAWING

A complete understanding of the invention and an introduction to other objects not specifically mentioned may be had from the following detailed description of an exemplified embodiment thereof, wherein similar reference characters refer to similar parts in each of the several views.

DESCRIPTION OF THE PREFERRED EMBODIMENT

Figure 1:
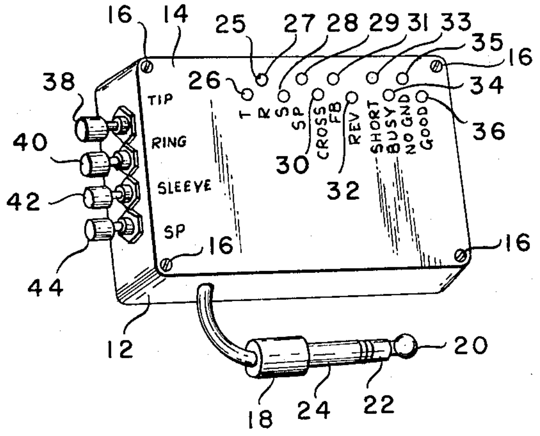
FIG. 1 is a perspective view of the testing device embodying the invention.

Referring to FIG. 1, the test device embodying the invention is designated as a whole by the reference character 10 and comprises a main housing 12 closed by a cover 14 fastened in place by four corner screws 16. From one side of the housing 12 there extends a conventional plug 18 having tip, ring and sleeve portions 20, 22, and 24 respectively. When the plug 18 is inserted in a jack available in the central office, a negative direct current potential for powering the test unit 10 appears on tip 20 and ground appears on sleeve 24. The cover 14 is provided adjacent one edge thereof with a plurality of openings 25, eleven in number, and arranged in two misaligned banks of six and five openings each so that each pair of adjacent openings are laterally offset from each other. Within each of the openings 25 provided in cover 14, there is disposed a lamp whose function is to visually indicate any of several defects commonly encountered in the wiring and rearrangement of distributing terminal assemblies. In the drawings, the lamps are designated by the reference characters 26 to 36, inclusive, and each lamp is assigned to carry out a particular signalling function as will be more clearly described hereinbelow, and which may be better understood with reference to the following table in which the reference characters adopted for the lamps, their signalling functions, and the corresponding legends prominently marked on cover 14 are compared:

| Lamp | Indication | Function |
|---|---|---|
| 26 | T | TIP |
| 27 | R | RING |
| 28 | S | SLEEVE |
| 29 | SP | SUPERVISORY |
| 30 | CROSS | CROSS |
| 31 | FB | FALSE BUSY |
| 32 | REV | REVERSE |
| 33 | SHORT | SHORT CIRCUIT DETECTION |
| 34 | BUSY | BUSY |
| 35 | NO GND | NO GROUND RETURNED |
| 36 | GOOD | GOOD |

Figure 2:
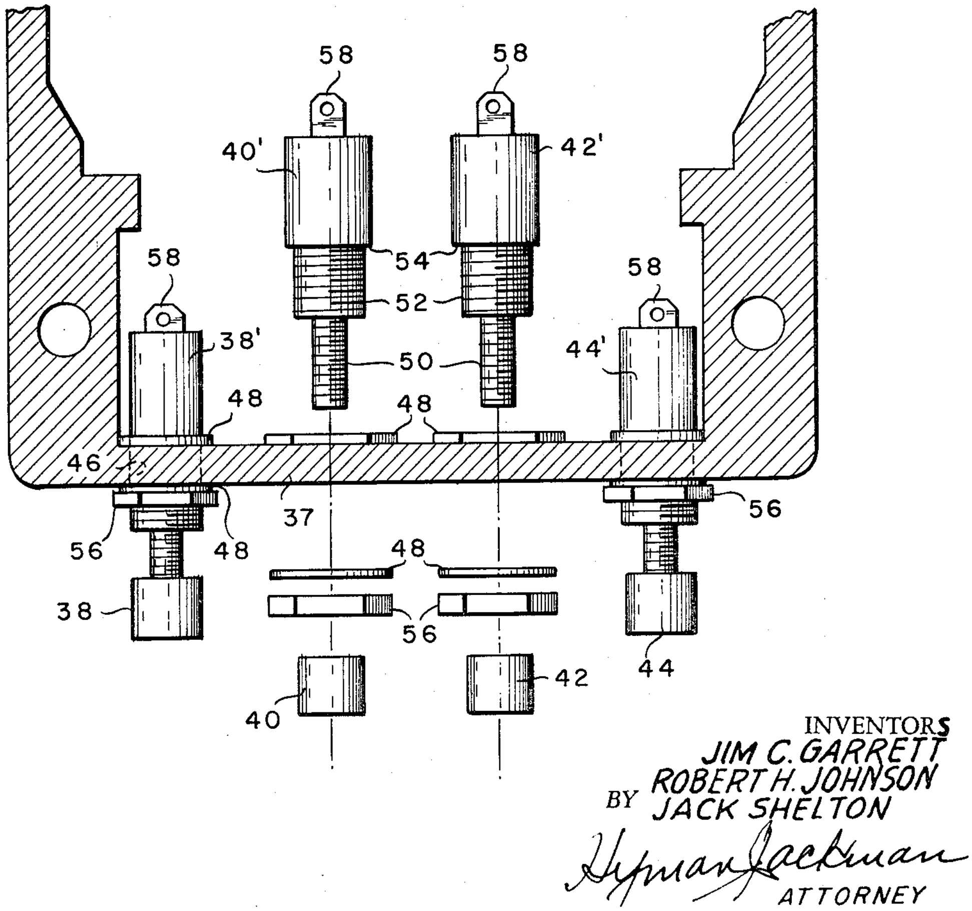
FIG. 2 is a view, with the wall of the casing in section, showing principally the push button construction of the probes forming a part of the testing device of FIG. 1.

Included on a side panel 37 of test device 10 are four spring loaded contacts 38, 40, 42 and 44 arranged in spaced relationship for operating corresponding push button switches 38', 40', 42' and 44' (FIG. 2) in order to detect the potentials present on the tip (T), ring (R), sleeve (S), and supervisory (SP) leads, respectively, associated with the distributing terminal assembly under test. As best shown in FIG. 2, openings 46 in which the switches are mounted are provided in panel 37. Washers 48 abut against opposing forces of panel 37 about each opening 46. An axially movable and spring loaded threaded portion 50 on each switch has a diameter slightly less than the diameter of a second threaded portion 52, and both project through the opening 46 a distance which brings shoulder 54 of each switch in abutting relationship with inner washer 48. In assembled relation, mounting nuts 56 mounted on portion 52 in snug relationship with outer washer 48 holds the switches in position on panel 37. The contacts 38, 40, 42 and 44 mounted on the threaded portion 50 of each switch complete the mechanical assembly.

As explained briefly hereinabove, the contacts 38, 40, 42, and 44 may at times be made to move inwardly from their normal positions, as shown. These contacts, when placed against corresponding terminals of a distributing terminal assembly under test, and sufficient force applied, will move inwardly a distance sufficient to operate a movable contact spring (not shown) associated with each switch into engagement with a fixed terminal 58 thereof, the parts being so proportioned that when the fixed and movable contacts are closed against each other to full compression, the potential present upon respective ones of the contacts 38, 40, 42 and 44 will be transferred to the terminal 58, to be applied in a manner which will be explained in detail hereinafter. Thus, by being pressed against the terminals of the distributing terminal assembly, the contacts 38, 40, 42 and 44 become spring loaded for automatic return. The compressive force demanded for operation of the contacts to their actuated positions is used as a mechanical verification to indicate the fact that contact has been made with all of the terminals being monitored, so that all aspects of each test are fulfilled.

Considering now FIGS. 3, 4, 5 and 6, there is shown the plug 18 and the contact buttons 38, 40, 42 and 44. With the plug 18 inserted in a jack made available in the central office, the tip 20 will engage a tip spring and provide battery voltage which is illustrated throughout the drawings by the reference character 60. For purposes of the present invention, it will be understood that office battery as used herein refers to a negative direct current potential. Office ground with the plug inserted is present on line 62, the ground symbol being entirely conventional. Thus, with the plug 18 inserted, battery voltage will exist at all locations identified by 60 and ground will exist at all locations bearing the same ground signal as that tied to the line 62.

Figure 3:
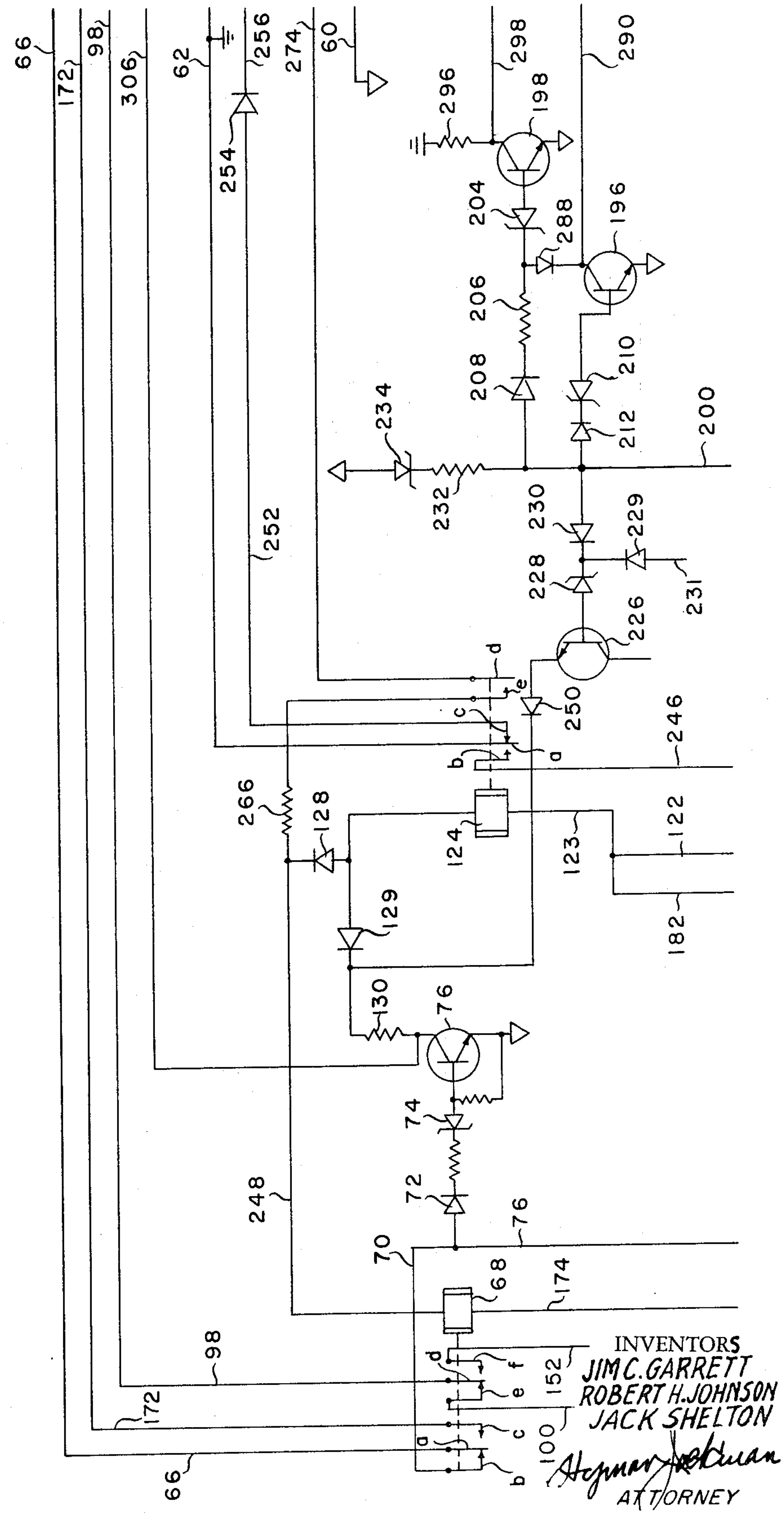
FIGS. 3, 4, 5 and 6, with FIGS. 3 and 4 placed end to end above FIGS. 5 and 6, likewise placed end to end, diagramatically illustrate the voltage sensing, electrical control, and display circuits of the test set shown in FIG. 1
Figure 4:
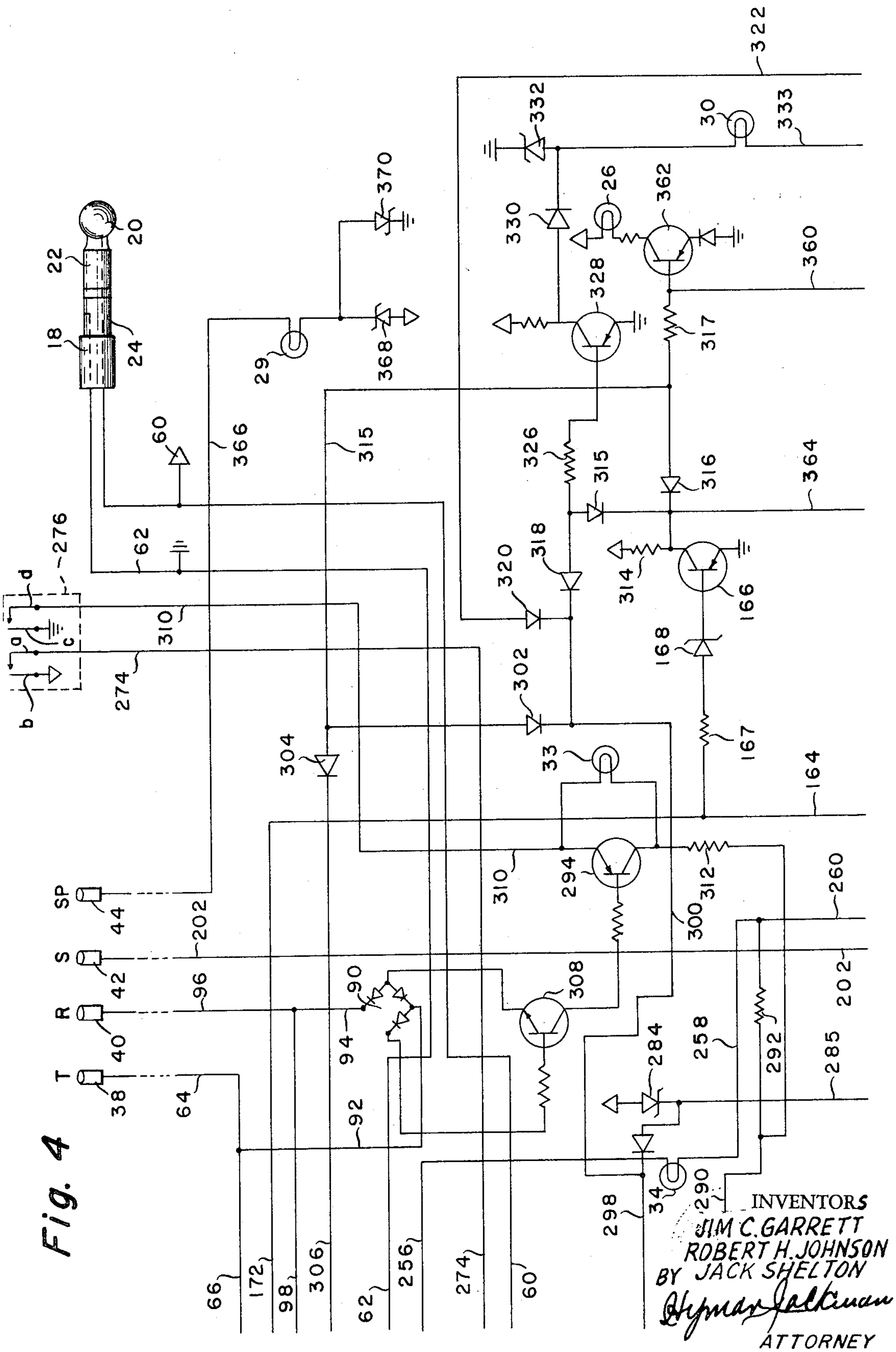
Figure 5:
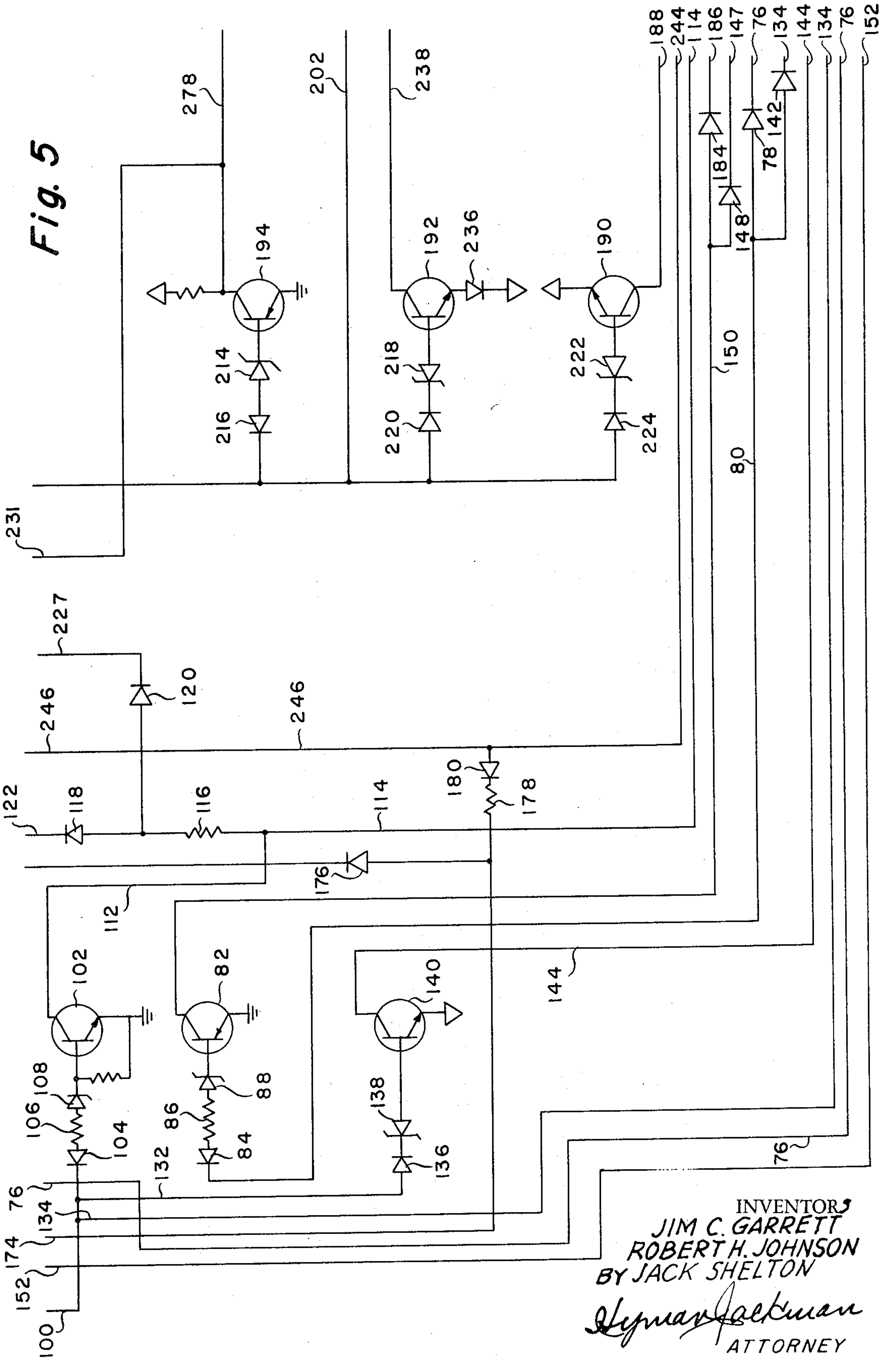

The broken lines shown in FIG. 4 beneath the contacts 38, 40, 42 and 44 represent the operation of the push button switches 38', 40', 42' and 44' in bringing the use of the test device 10 the potentials which are present once contact by the switch probe assembly is made. Referring specifically to the tip contact 38, it is connected by lines 64 and 66 to the moveable contact *a* which is normally engaged with a fixed contact *b* of a relay 68 having a second fixed contact *c* and a second bank of transfer contacts represented by the movable contact *d* associated with fixed contacts *e* and *f*. From contact *b* of relay 68, a line 70 connects to the positive electrode of a diode 72 whose negative electrode is resistively connected to a zener diode 74, at a rating of 43 volts, connected in turn to the base of a transistor 76. From the junction of line 70 and diode 72; a line 76 extends through a diode 78 to line 80 connected to the base of a transistor 82 through diode 84, resistor 86, and zener diode 88. Referring now to line 64, it also extends to a full wave rectifier 90 via line 92. Feeding into rectifier 90 via line 94 is a line 96 connected to the R contact 40. From the junction of lines 94 and 96, a line 98 is connected to contact *d* of relay 68 which, in the normal condition, establishes a contact *d–e* which, via line 100, is connected to the base of transistor 102 via a diode 104, resistor 106, and zener diode 108. The emitter of transitor 102 is tied to ground, there being a base-emitter connection through resistor 110. From the collector of transistor 102 a line 112 extends to the junction of line 114 and resistor 116. Extending into FIG. 6, line 114 couples to a diode 115. Common with the upper connection of resistor 116 as illustrated in FIG. 5 are diodes 118 and 120. The cathode of diode 118 passes via lines 122 and 123 to one side of the winding of a relay 124 whose other side is carried via diode 128 to the upper terminal of relay 68 as illustrated in FIG. 3. Also from relay 124, a line extends via diode 129 and resistor 130 to the collector of transistor 76. Under control of relay 124 is the set of contacts *a*, *b* and *c*, with the contact *a–c* being established when relay 124 is deenergized, and a second contact set including movable contact *d* normally separated from contact *e*, but movable into engagement therewith when relay 124 becomes energized.

The line 100 which extends from contact *e* of relay 68 extends over further parallel paths exemplified by lines 132 and 134, the former being coupled via diode 136 and zener diode 138 to the base of a transistor 140 the emitter of which is connected to negative office battery thereby establishing the necessary reverse bias. The line 134, when traced through FIGS. 5 and 6, passes through diode 142 to the junction of line 80 and diode 78. In somewhat similar fashion, the collector of transistor 140 is connected via line 144 to lamp 32 from which, through resistor 146, line 147, diode 148, and line 150 it extends to the collector of transistor 82.

From contact *f* of relay 68, line 152 is coupled through a diode 154, resistor 156, and zener diode 158 to the base of transistor 160 the emitter of which is connected to office battery. From the junction of resistor 156 and diode 154, a line 161 through resistor 162 and line 164 is connected to the base of a transistor 166 via resistor 167 and zener diode 168. This line 164 is also returned via line 172 to fixed contact *c* of relay 68.

The relay 68 as shown in FIG. 3 has a line 174 having a junction at diode 176 and the serially connected resistor 178 and diode 180, the cathode of diode 176 being connected to the winding of relay 124 via lines 182 and 123. Carrying further the description of FIG. 5, the collector of transistor 82, via line 150, is coupled to diode 184 in turn connected to line 186. The lamp 31 has one end thereof connected to line 186 and at its other end is resistively connected over a line 188 to the collector of a transistor 190. Arranged essentially in vertical formation above transistor 190 are transistors 192, 194, 196, and 198 which, although capable of independent voltage sensing operation, are coupled by asymmetric conducting elements coupled to a line 200. Connected to line 200 for completing its function in the test sequence to be discussed, is a line 202 which when followed through FIGS. 5, 6, and 4 may be seen connected to the S contact 42. As seen in FIGS. 3 and 5, the following connections are established with line 200: the base of transistor 198 via zener diode 204 rated at 33 volts, resistor 206, and diode 208; the base of transistor 196 via zener diode 210 rated at 45.4 volts and diode 212; the base of transistor 194 through zener diode 214 rated at 45.4 volts and diode 216; the base of transistor 192 via zener diode 218 rated at 45.4 volts and diode 220; the base of transistor 190 by means of zener diode 222 rated at 45.4 volts and diode 224; and the base of a transistor 226 (FIG. 3) through zener diode 228 rated at 12 volts and diode 230. The collector of transistor 226 is coupled via line 227 to the cathode of diode 120. From line 200 upwardly as seen in FIG. 3 resistor 232 and zener diode 234 are coupled to office battery.

The emitter of transistor 192 is connected to office battery through diode 236. Its collector electrode is connected by line 238 to one side of NO GROUND lamp 35 whose other side is connected to office battery. Through resistor 240, diode 242, and line 244, the collector of transistor 192 is connected to a line 246 which in turn is connected to contact *b* of relay 124. Through diode 128 and line 248 a serial connection is established between the windings of relays 68 and 124. Carrying the description of relay 124 one step further, the one winding end thereof is connected via diodes 129 and 250 to the emitter of transistor 226. Of the remaining contacts of relay 124, contact *a* is connected to ground at line 62; contact *c* is connected to office battery over a path which includes line 252, diode 254, line 256, lamp 34, lines 258, 260 and 262, lamp 36, lines 264, resistor 240 and lamp 35; contact *e* branches to resistor 266; contact *d* via line 274 extends to the fixed contact *a* of one-half of a set of contacts referenced broadly 276, shown as having movable elements *b* and *c*, the contacts *a–b* and *c–d* thereof normally being open with the switch in its relaxed condition, as shown. In accordance with the invention, the ring contact 40 further has associated therewith the movable contact *c* which is closed into engagement with contact *d* when the ring contact 40 is pressed against the terminal under test. In a similar manner, the sleeve contact 42 when fully pressed closes the contact *a–b* thereby placing office battery on line 274.

Transistor 194 has its emitter coupled to ground and its collector, over one path resistively connected to office battery, and over a second path via line 278 arriving at the junction of diode 280 and a line 282. A series resistive and diode circuit to which the cathode of diode 280 is coupled commences at office battery and includes zener diode 284 (FIG. 4), line 285, lamp 28 and zener diode 286 to ground.

Transistor 196 has its emitter coupled to office battery, while its collector is connected over one path including diode 288, and over a second path via line 290 and resistor 292 to the junction of lines 258 and 260, and over a third resistive path to the collector of transistor 294 (FIG. 4).

The emitter of transistor 198 is connected to office battery and its collector through resistor 296 is connected to ground, with a further connection of the collector via lines 298 and 300, diodes 302 and 304, and line 306 to the collector of transistor 76.

Figure 6:
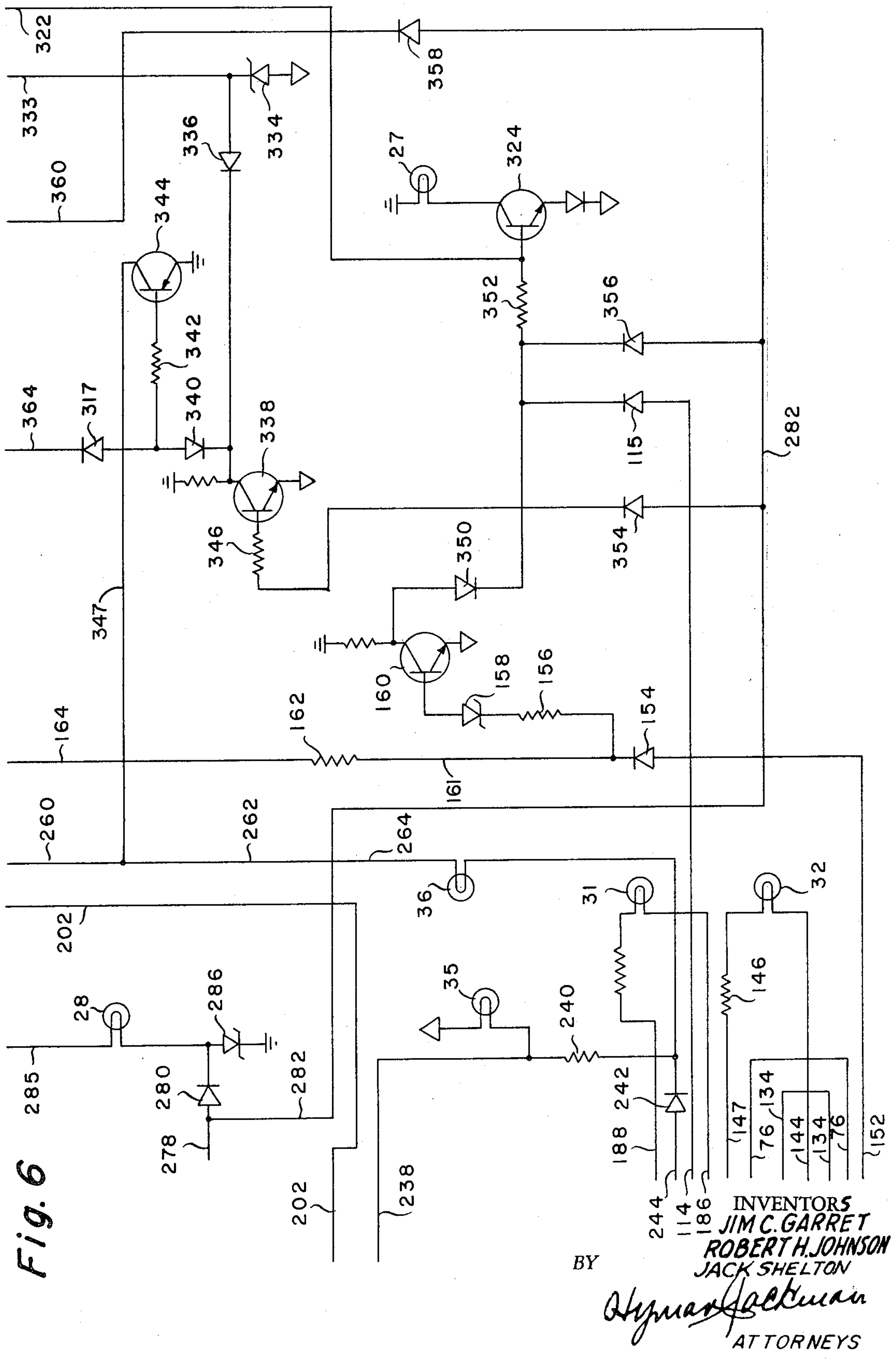

Turning now to FIG. 4, the base of transistor 294 is resistively connected to the collector of a transistor 308 the emitter-base junction of which is connected across the output terminals of rectifier 90. The collector and emitter of transistor 294 is bridged by lamp 33. Line 310 connects the emitter of transistor 294 to fixed contact *d* of contacts 276. A resistor 312 couples the collector of transistor 294 to line 290 and the collector of transistor 196. The emitter of transitor 166 is connected to ground. Its collector through resistor 314 is connected to office battery, the collector also being brought out to the junction of three diodes 315, 316 and 317, all of which have their cathodes connected in common. A connection from the anode of diode 315 extends to diodes 318 and 320, line 322, to the base of a transistor 324, and also extends through resistor 326 to the base of a transistor 328. The emitter of transmittor 328 is coupled to ground, whereas the collector is resistively coupled to office battery, and further is connected through diode 330 and zener diode 332 to ground. The lamp 30 is connected between office battery and ground via line 333 and zener diodes 332 and 334. Above and to the left of zener diode 334 as seen in FIG. 6 is diode 336 whose cathode electrode is connected, on the one hand, to the collector of transistor 338 and, on the other hand, through diode 340 and resistor 342 to the base of transistor 344. By means of line 347 the collector of transistor 344 is coupled to the junction of lines 260 and 262. The emitter of transistor 338 is connected to office battery. The base through a resistor 346 and diode 248 is connected, over one path, to the collector of transistor 160, and, over another path including diode 350 and resistor 352 to the base of transistor 324. Viewing now the lower part of FIG. 6, from line 282 diode 354 is coupled by resistor 346 to the base of transistor 338, diode 356 is coupled by resistor 352 to the base of transistor 324, and diode 358 is direct coupled via line 360 to the base of transistor 362. Essentially completing the vertical interconnections between FIGS. 4 and 6 is a line 364 coupled to the collector of transistor 166.

The SP contact 44 is connected via its associated push button switch and line 366 to lamp 29 from which, via zener diodes 368 and 370, connections extend to office battery and ground, respectively.

OPERATION

With regard to the drawings, the operation of the invention occurs in the following manner. Initially, it will be assumed that the test device 10 is in its quiescent condition, i.e., with the necessary supply voltage and ground return being supplied by plug 18. In this quiescent condition, the contact 38, 40, 42 and 44 are assumed to be out of engagement with any corresponding terminals of the distributing terminal assembly under test. This condition having been established, none of the lamps 26 through 36, inclusive, are lit. When contact is made by the technician with the DTA terminals the tip contact 38, ring contact 40, sleeve contact 42, and supervisory contact 44 will sense the voltage conditions present.

As before mentioned, with sleeve and ring contacts 42 and 40 fully pressed, office battery and ground, respectively, appear on lines 274 and 310. The operation of the zener diodes to provide precise voltage control at the zener voltage rating of the diode is well known and need not be described in further detail. The aforementioned zener diodes thus all have an assigned voltage rating and, once reverse biased into the avalanche or zener region, maintain a set voltage level as long as the zener voltage is applied.

SP CONTACT

SP contact 44 is monitored for the presence of either office battery or office ground. If office battery is present on contact 44 current flow over line 366 takes place through SP lamp 29 and diode 370. In the preferred embodiment, diode 370 may have a rated voltage of 27 volts. If, on the other hand, office ground is sensed on contact 44, diode 368 is biased into a conducting state resulting in having SP lamp 29 again become lighted. Thus, current flow through lamp 29 will result in its operation, giving rise to the indication that either office battery or office ground is present on contact 44.

SLEEVE CONTACT

In the preferred embodiment, the circuit herein associated with the monitoring voltage senses on S contact 42 is responsive to four specific voltage conditions. The first of these conditions to be described is less than 2.5 volts above office ground which those skilled in the art will recognize to be the condition of the sleeve lead of a normal trunk which is in a busy condition. This condition is also typical of a sleeve lead which is shorted to ground, sometimes expressed in terms of a false busy condition. Differentiation between a normal busy condition and a false busy condition is facilitated by transistor 82, which monitors the presence or absence of a loop condition between contacts 38 and 40. It is well known that in a normal busy condition a resistive loop exists between the tip and ring leads.

When push button switch 42' is activated, voltage sensed thereon is transmitted by line 202 to branch line 200. Transistor 196 will produce an output voltage when the sleeve potential on line 200 is less than 2.5 volts above office ground. The zener voltage of diodes 210, 214, 218 and 228 is 45.4 volts. At a voltage on line 200 less than 2.5 volts above office ground the zener voltage of diode 210 will be exceeded and current will thus flow from contact 42 through diode 210 in a backward direction to thus bias transistor 196 into conduction. The output voltage on the collector of transistor 196 is the negative 50 volts appearing at its emitter from office battery 60. This negative 50 volts is passed through diode 288 to hold the junction of resistor 206 and zener diode 204 at a voltage sufficient in magnitude to prevent biasing diode 204 to a conductive state. Diode 34 is rated at 33 volts. The output potential of transistor 196 is also applied through line 290 and resistor 292 to one terminal of lamp 34. The other terminal of lamp 34 is connected by line 256, diode 254, line 252, and contact *a–c* of relay 124 to office ground. Thus, it will be seen that the "ON" condition of transistor 196 causes lamp 34 to light, thus indicating the presence of sleeve potential less than 2.5 volts above office ground.

The negative 50 volts at the collector of transistor 196 when conducting is further applied through resistor 312 to the collector of transistor 294, whose operation depends upon the operation of transistor 308. By way of explanation, it can be seen that the base-emitter junction of transistor 308 is connected across the output terminals of rectifier 90. When a difference of potential of more than 1.2 volts exists between tip contact 38 and ring contact 40, transistor 308 is biased into conduction. This allows the negative potential on ring contact 40 to be applied to the base of transistor 294 whereby it is triggered into conduction. It can thus be seen that transistor 294 in conduction effectively places a shunt across SHORT lamp 33 so that it remains dark. Assuming, however, that with transistor 196 conducting, the contacts 38 and 40 are shorted, no difference in potential exists between them which causes transistor 308 to be nonconducting with the result that transistor 294 likewise is nonconducting. With transistor 196 operating, current flow through lamp 33 is established from the office battery source at the emitter of transistor 196 to the contact *c–d* of contacts 276, which constitutes a source of ground for lamp 33. This causes lamp 33 to light creating a visual indication of short between tip and ring contacts.

With respect to the second condition regarding the potential on sleeve contact 42, transistor 226 assumes a conductive state when the sleeve potential is less than 3.5 volts above office ground. Zener diode 228 is rated at 12 volts and a voltage on line 200 less than 3.5 volts above office ground causes current to flow through diode 228 in a reverse direction which biases transistor 226 into conduction. The operation of transistor 226 through its collector-emitter junction establishes a path of practically zero resistance across the terminals of relay 124 which prevents it from operating. Thus, the operation of transistor 226 is tantamount to placing a short circuit between the junction of resistor 130 and diode 129 and the junction of resistor 116 and diode 120. With relay 124 unable to operate, the secondary tip and ring sensing circuitry, hereinafter to be described, will not be applied to the trunk. This prevents any attempt at seizing a trunk which shows a potential present on the sleeve.

Transistors 190 and 192 are also switched into conduction when the potential on sleeve contact 42 is less than 3.2 volts above office ground. The operation of transistor 190 places its collector at office battery which is applied over line 188 to one terminal of false busy lamp 31. The other terminal of lamp 31 is connected by line 186, diode 184, and line 150 to the collector of transistor 82. Lamp 31 is dependent for a ground return upon the operation of transistor 82, and since transistor 190 will be operated only when a false busy condition is really present, the lighting of lamp 31 is a valid indication of a false busy condition.

When transistor 192 is biased into conduction, this results in office battery voltage of 50 volts being switched through diode 236 and line 238 to one terminal of NO GROUND lamp 35, the other terminal of which is connected to office battery. Thus, it can be seen that no difference of potential will exist across lamp 35 when transistor 192 is turned on. Thus, prior to the operation of relay 124, the biasing into conduction of transistor 236 effectively places a shunt across lamp 35 so that it does not produce any visible indication. Ground is normally supplied to lamp 35 from contact *b* of relay 124. Thus, lamp 35 is the "no ground return lamp"; stated differently, ground return on the sleeve contact 42 activates transistor 192 and inhibits the lighting of lamp 35.

The third condition now to be examined regarding the potential sensed on S contact 42 concerns trunking situations when the ground through a resistance appears on the sleeve lead by virtue of having either a tip sleeve cross or a tip sleeve reversal. Under either of these conditions, the voltage sensed on contact 42 can be expected to fall within the range of more than 3.2 volts above office ground but less than 15.8 volts above office ground. Diode 234 and resistor 232 (FIG. 3) form a voltage divider which allows sufficient current to flow to cause a voltage drop across whatever resistance may be present in the sleeve lead at this time. This allows the voltage on the sleeve lead to assume a slightly larger value than would be possible without the use of resistor 232 and diode 234. Thus, as used in the present embodiment, the network including resistor 232 and diode 234 accentuates the voltage conditions which typify the presence of a ground on the sleeve lead seen through a resistor. This allows the sleeve potential-sensing circuitry to more easily distinguish between a sleeve lead which is connected directly to office ground from one which has a resistive connection to office ground.

Transistor 198 will be biased into conduction as the potential sensed on sleeve contact 42 achieves a value of more than 3.2 volts but less than 15.8 volts above office ground. The operation of transistor 198 places the one terminal of lamp 28 at negative office battery via line 298. The appearance of negative 50 volts effectively bypasses zener diode 284 and completes an energizing circuit for S lamp 28 which includes zener diode 287 of 27 volt rating. With diode 286 biased into the zener region, current flows through SLEEVE lamp 28 causing it to become lit.

The operation of transistor 198 further causes negative office battery to be applied via lines 298 and 300 to the junction of diodes 302, 318 and 320. Through diode 302, this voltage is applied via line 315 to the junction of diode 316 and resistor 317 thereby biasing transistor 362 into conduction. Thus turned on, tip lamp 26 becomes lighted. Through diode 320, the negative potential at the collector of transistor 198 when conducting is applied via line 322 to the base of transistor 324, which imposes a heavy reverse bias and thus prevents ring lamp 27 from becoming lighted. Through diode 318, this same negative potential is applied through resistor 326 to the base of transistor 328. This constitutes forward biasing transistor 328 into conduction whereupon its collector is substantially placed at ground. The operation of transistor 328 completes a path whereby zener diode 334 is biased into the zener region. This establishes a current flow which operates the cross lamp 30, thereby giving a visual indication of the tip sleeve cross by virtue of the lighted conditions of lamps 26, 28 and 30.

The fourth condition of sensitivity of the voltage-sensitive network comprising those transistors coupled asymmetrically to branch line 200 is the one in which the potential sensed at sleeve contact 42 is more than 46.8 volts above ground. This condition is present in trunking distribution in the case of either a ring sleeve cross or a ring sleeve reversal. Thus, whereas the earlier case illustrated hereinabove dealt with aberrations involving the tip and sleeves contact, the discussion now to be taken up in the operation relates to abnormal conditions of the sleeve lead with respect to the ring lead. As such, transistor 194, illustrated herein as the PNP type, is the only transistor directly operated by a sleeve potential of more than 46.8 volts above office ground, this value being sufficient to bias diode 214 into the zener region. The other sleeve voltage sensing transistors 190, 192, 196, 198 and 226 all are reverse biased into a nonconducting state. The operation of transistor 194 switches ground to its collector terminal. The ground is then fed through diodes 229, 280, 354, 356, and 358 to perform five separate functions.

Through diode 228 via line 231, ground from transistor 194 is applied to the base of transistor 226 thus biasing it into conduction. This results in the disabling of relay 124 by establishing the previously described shunt path across its winding.

Through diode 280, zener diode 286 effectively is rendered inoperative. This has the effect of placing ground from transistor 194 to one terminal of sleeve lamp 28. Zener diode 284 becomes reverse biased into the zener region which causes sleeve lamp 28 to light, giving a visual indication.

Through diode 354 via line 282, the ground from the collector of transistor 194 is applied to the base of transistor 338 thereby causing it to conduct. This places the office battery now present at the collector of transistor 338 at the junction of diodes 334 and 336. The zener voltage of diode 332 will be exceeded and current will thus flow through cross lamp 30 to ground.

Through diode 356, the ground from the collector of transistor 194 is applied to the base of transistor 324 thus biasing it into conduction. The operation of transistor 324 provides a current path by which the ring lamp 27 is caused to operate. It therefore will be understood that the indication observed by the technician at this point is a sign of a ring sleeve cross by virtue of the illumination of lamps 27, 28, and 30.

Through diode 358, the ground from the collector of transistor 194 is applied to the base of transistor 362. This maintains the base of transistor 362 at such potential with respect to its emitter that it is biased "OFF." This prevents operation of the tip lamp 26.

TIP AND RING CONTACTS-PRIMARY SENSING

The primary sensing of the tip and ring contacts occurs in the present invention with relay 124 deenergized. However, as will be described, the operation of relay 124 switches the tip and ring leads of the trunk under test from the primary ring and tip sensing circuits of the invention to the secondary tip and ring sensing circuits.

The tip sensing circuit is responsive to a voltage less than 2.5 volts above office ground. A voltage on contact 38 of less than 2.5 volts above office ground is recognized as a normal idle trunk, and any higher potential is indicative of either a normal busy condition or a trouble condition. In operation, a voltage sensed at tip contact 38 of less than 2.5 volts above ground is applied over lines 64, 66, contact *a–b* of relays 68, line 70 and through diodes 72 and 74 to the base of transistor 76. The ensuing operation of transistor 76 causes the appearance of a negative voltage at the base of transistor 362 (FIG. 4) over a path including line 306, diode 304, line 315 and resistor 317. Transistor 362 is thus biased into conduction thereby causing tip lamp 26 to light. The negative voltage present at the collector of transistor 76 also is applied to the upper terminal of relay 124, as viewed from in FIG. 3. This prepares relay 124 for operation, provided that the voltage condition on ring contact is normal, and providing that the voltage condition on sleeve contact 42 has not caused transistor 226 to operate. When transistor 226 operates, transistors 76 and 102 complete the path for the flow of collector current.

The primary ring sensing circuit is responsive to a voltage more than 47.5 volts above office ground. A voltage in excess of 47.5 volts above office ground is recognized as indicative of the ring lead of a normal idle trunk. A lower potential is viewed as either a ring lead in a busy condition or a trouble condition. With the voltage condition assumed, this voltage is fed to the base of transistor 102 which thereby begins to conduct to ground which now appears at the collector of transistor 102 and is coupled to the base of transistor 324 via a path including line 114, diode 115 and resistor 352. Transistor 324 begins to conduct as a result thereby illuminating ring lamp 27 thus indicating a normally operating ring lead in the trunk under test.

The ground present at the collector of transistor 102 is also applied through resistor 116, diode 118 and lines 122 and 123 to the ground or lower terminal of relay 124. It can be seen from the description thus far that the circuit for energizing relay 124 may be traced over the following path:

office battery, transistor 76, resistor 130, the winding of relay 124, lines 122 and 123, diode 118, line 116, and transistor 102. Operation of relay 124 is therefore dependent upon proper voltages being present at both the tip and ring contacts.

TIP AND RING CONTACTS — NEGATIVE SENSING

When the voltage in excess of 47.5 above office ground is present on either the tip contact 38 or ring contact 40, this voltage is conveyed to the base of transistor 82. If present on contact 38, the path to transistor 82 includes lines 64 and 66, contact *a–b* of relay 68, lines 70 and 76, diode 78, line 80, resistor 86 and zener diode 88, whereby diode 88 is biased into the zener region. If, on the other hand, the potential experienced by the base of transistor 82 has its source at the ring contact 40, transistor 82 is biased into conduction over the following path: lines 96 and 98, contact *d–e* of relay 68, lines 100 and 134, diode 142 and continuing over the circuit previously described. The ground which appears at the collector of transistor 82 under these circumstances performs two operations.

Through diode 148 and line 147 the ground from the collector of transistor 82 is applied to one terminal of REVERSE lamp 32. If at the time that transistor 82 is turned on by virtue of the energizing potential on the tip contact 38, a voltage of less than 3.8 volts above office ground appears on ring contact 40, transistor 140 will become biased into conduction simultaneously with the operation of transistor 82, thereby energizing lamp 32. This path to the base of transistor 140, over which zener diode is biased into its zener region, includes diode 136 and lines 132 and 100. Thus, it will be understood that the lighting of REVERSE lamp 32 is conditioned upon the simultaneous conduction of transistors 82 and 140, in response to the appropriate tip and ring voltages.

Through diode 124 and line 186, the ground transferred to the collector of transistor 82 is supplied to the lower terminal of FALSE BUSY lamp 31, as seen in FIG. 6. Thus, as was described hereinabove when having considered the operation of the sleeve sensing network, the activation of lamp 31 depends upon transistor 190 also being in a conducting state. This was the case as explained of a sleeve potential less than 3.2 volts above ground. The operation of FALSE BUSY lamp 31 is completed therefore, assuming correct conditions to be present, over a circuit which includes transistors 82 and 190.

TIP AND RING CONTACTS — TRANSFER OPERATION

It is reiterated that when no foreign potential has been detected on the sleeve contact 42, and the tip and ring contact voltages correspond to those encountered on the tip and ring leads of a normal idle trunk, transistors 76 and 102 are biased into conduction which results in relay 124 becoming operated over the path previously traced. Operation of relay 124 performs a number of transfer functions:

Contact *d–e* of relay 124 is established which presents a negative potential available to facilitate the latching operation of relay 124. The latch voltage is available from contact *a–b* of switch 276 and is applied through diode 128 to the upper terminal of relay 124, as seen in FIG. 3.

Contact *a–c* of relay 124 is broken which disables the circuit to BUSY lamp 34 since the trunk has already been tested for the various busy conditions.

Contact *a–b* of relay 124 is closed. A circuit extending from this contact over line 246 line 244, diode 242, and resistor 240 actuates the NO GROUND lamp 35. This ground is also applied via diode 180 and resistor 178 over dual paths, the one including diode 176 and line 182 to the other terminal of relay 124, and the other path being the line 174 leading to the other terminal of relay 68. It can be seen that the switching operations caused by relay 124 causes the appearance of 24 volts across the windings of both relay 124 and relay 68. As a result, relay 124 remains a self-latching circuit controlled by the switch 276 and relay 68 operates. With relay 68 operated, resistor 162 is placed between the tip and ring terminals under test. Thus, the transfer of the tip contact voltage takes place at contact *a–c* of relay 68 and via line 172 and diode 170. The balance of the series circuit including resistor 162 includes diode 154, line 152, contact *d–f* of relay 68, and lines 98 and 96. Resistor 162 thus provides a current flow path between the tip and ring of the trunk under test. As a result of the current flow created by this condition, the voltage present on the tip and ring leads of the trunk is affected. The voltage present on a normal tip lead will be of sufficient magnitude to cause zener diode 168 and transistor 166 to remain in a conductive state. Diode 168 has a rating of 3.9 volts. The voltage present at ring contact 40 in a normal condition is suffiecient to bias zener diode 158, which also has a zener voltage of 3.9 volts, into reverse conduction thereby causing transistor 160 to conduct.

Having described the operation of the invention embodiment with respect to satisfactory tip and ring voltages which cause transistors 160 and 166 to operate, the operation of the invention circuit when the voltage in tip contact 38 is insufficient to hold diode 168 and transistor 166 conducting, and when the voltage on ring contact 40 is insufficient to maintain diode 158 and transistor 160 in a conductive state, will now be described. A voltage on tip contact 38 below the level necessary to maintain transistor 166 operating is indicative of either a tip-tip cross condition or a tip-ground cross condition. With transistor 166 "OFF" the collector is at office battery potential. This negative potential is fed through three diodes 315, 316 and 317 to perform three separate operations.

Through diode 315, the transistor 328 is biased into conduction. As previously described, operation of transistor 328 provides a ground connection through which cross lamp 30 becomes illuminated. Through diode 316, the negative potential from transistor 166 bias transistor 362 into conduction whereupon tip lamp 26 becomes lit. Through diode 317, transistor 344 experiences the negative collector voltage of transistor 166 and thus begins to conduct. Via lines 346 and line 262, the ground which appears at the collector of transistor 344 is applied to one terminal of GOOD lamp 36 which disables this lamp by effectively placing it between two ground terminals.

A voltage on ring contact 40 which is below the level necessary to maintain transistor 160 conducting is indicative of either a ring-ring cross condition or a ring-battery cross condition. Under these conditions, transistor 160 is "OFF" so that its collector remains at ground. The ground is applied through the diodes 348 and 350 to perform two separate functions. Through diode 348, the base of transistor 338 is biased forwardly which causes the flow to collector current. This results in the appearance of office battery at the junction of diodes 334 and 336, whereupon, in a manner previously described, CROSS lamp 30 is enabled. The office battery is fed as well to transistor 344 which causes it to conduct, and ground to be applied to the upper terminal of GOOD lamp 36. This again effectively disables lamp 36 by virtue of having ground at its other terminal via contact *a–b* of relay 124.

Through diode 350, the ground present at the collector of transistor 160 biases transistor 324 into conduction. RING lamp 27 becomes lit as a result.

During the period when relays 68 and 124 are simultaneously operated, and resistor 162 is placed effectively between the tip and ring contacts of the trunk under test, the trunk associated equipment should respond by placing a ground on the sleeve lead. Since the BUSY lamp 34 has been disabled by the operation of the relays, the presence of the sleeve ground will be indicated by the GOOD lamp 36. The presence of ground effectively at branch lead 200 is less than 2.5 volts above ground and thus establishes a potential difference sufficient to bias diode 210 into the reverse region. This causes transistor 196 to conduct whereby via line 290, resistor 292, and lines 260 and 262 office battery is applied to one terminal of GOOD lamp 36. The other terminal is returned to ground as previously described so that, provided transistor 344 has not been activated by recognition of a trouble condition on either the tip or ring contact, GOOD lamp 36 is caused to light. At the same time as transistor 196 is conducting, transistor 192 will be conducting which effectively places office battery across NO GROUND lamp 35 causing it to remain dark. By remaining dark, it can be seen that lamp 35 provides an indirect indication of the presence of ground on sleeve contact 42. If, however, at this time, no ground potential appears at the sleeve contact 42, transistor 192 will remain "OFF." With relay 124 still operated, lamp 35 will be enabled and remain lit until such time as ground is again sensed by the base of transistor 192. Appearance on branch line 200 of a potential more than 2.5 volts above office ground will be indicated in the same manner as described under the operation concerned with the sleeve voltage-sensing network.

From the foregoing, it will be apparent that there has been provided a tester which demonstrates extreme versatility in monitoring distributing terminal assemblies by being capable of detecting all common defects associated with the input wiring of step by step telephone switches. It presents as extremely advantageous features in the field of central office testing the absence of complex technical assessment of the lamp indications. Thus, not only the presence of the defect encountered is indicated, but its exact nature as well. Furthermore, the present invention as described provides a specific indication of false busy conditions whether or not they have resulted in a permanent relay seizure. No complex connecting procedures are required; the entire test sequence takes place during one momentary contact with the terminals being tested. Its pocket size makes the tester of the invention completely portable. Its ability to detect and indicate double trunk crosses as well as cross conditions which entail shorts and reversals of the members of a single trunk further renders the tester embodying the invention of great value in an otherwise extremely complex testing environment.

Although we have herein shown and described only one form of apparatus embodying our invention, it is to be understood that various changes and modifications may be made therein, without departing from the spirit and scope of the claims.

Having thus described the invention, what is claimed and desired to be secured by Letters Patent is:

1. A tester for a distributing terminal assembly having tip and ring terminals for a trunk under test comprising:

input contact means for extending into said tester the voltages at said tip and ring terminals of said distributing terminal assembly;

a plurality of switching means each having a control electrode;

zener diode means equal in number to said switching means and having the electrodes thereof arranged with respect to said control electrodes for being driven to current flow in a reverse direction;

visual indicators;

output means controlled by said switching means for operating said indicators selectively in accordance with the voltages at said tip and ring terminals; and relay means operated by said switching means when said tip and ring voltages correspond to voltages encountered on the tip and ring leads of a normal idle trunk for seizing said trunk by connecting a resistance element across said tip and ring terminals.

2. The tester as set forth in claim 1 wherein said input contact means are movable from a first position in engagement with said terminals to a second position in engagement with said terminals and with said switching means.

3. The tester as set forth in claim 1 wherein said input contact means terminate in an electrically conductive portion shaped to engage the selected terminals of said distributing terminal assembly simultaneously when impressed into position for conducting the test.

4. The tester as set forth in claim 1 in which said input contact means occupy a first position when impressed with substantially no force against corresponding terminals of said distributing terminal assembly but actuable to a second position opposed by a spring loaded force thereby ensuring the automatic return of said input contact means once removed from said terminals.

5. The tester as set forth in claim 1 in which said input contact means engage the tip, ring, sleeve and supervisory terminals of said distributing terminal assembly.

6. A tester for telephone trunks terminating in a distributing terminal assembly having tip, ring, sleeve and supervisory terminals comprising:

a casing;

a plurality of electrical contacts protruding from said casing for establishing contact with a corresponding number of terminals of said distributing terminal assembly including said tip, ring, sleeve, and supervisory terminals;

a power line protruding from said casing for obtaining thereat central office battery potential having a reference to ground potential;

semiconductive switching means connected to said tip, ring, sleeve and supervisory terminals at said distributing terminal assembly for operating from a quiescent to a switching condition in response to voltages at said sensed terminals having a predetermined value;

a plurality of lamps under the control of said switching means in the switching condition thereof for completing a visual indication coincident with said voltages; and relay means operated by said switching means when said tip and ring voltages correspond to voltages encountered on the tip and ring leads of a normal idle trunk for connecting a resistive loop between the tip and ring contacts whereby said trunk under test is seized.

7. The tester as set forth in claim 6 in which said electrical contacts are push button switches so arranged that when pressed against tip, ring, sleeve and supervisory terminals, with no further force applied, voltages present at said terminals are sensed, but when further force is applied resulting in actuation of said push buttons to an operated position, said voltages enable said switching means according to the voltage levels on said terminals.

8. The tester as set forth in claim 6 further including, in combination, zener diodes electrically in advance of said switching means and having predetermined zener voltages for actuating corresponding ones of said switching means simultaneously as the voltage appearing at said tip, ring, sleeve and supervisory terminals undergoes variation.

* * * * *